(12) United States Patent
Kim

(10) Patent No.: US 11,545,706 B2
(45) Date of Patent: Jan. 3, 2023

(54) BATTERY CELL HAVING A PLURALITY OF ELECTRODES AND BATTERY MODULE USING THE SAME

(71) Applicant: SK INNOVATION CO., LTD., Seoul (KR)

(72) Inventor: Hyun Seok Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 16/445,737

(22) Filed: Jun. 19, 2019

(65) Prior Publication Data

US 2019/0386259 A1 Dec. 19, 2019

(30) Foreign Application Priority Data

Jun. 19, 2018 (KR) .................. 10-2018-0070373
Jun. 19, 2019 (KR) .................. 10-2019-0072890

(51) Int. Cl.
  *H01M 50/10* (2021.01)
  *H01M 50/20* (2021.01)
  *H01M 50/502* (2021.01)
  *H01M 50/543* (2021.01)

(52) U.S. Cl.
  CPC ........... *H01M 50/10* (2021.01); *H01M 50/20* (2021.01); *H01M 50/502* (2021.01); *H01M 50/543* (2021.01)

(58) Field of Classification Search
  None
  See application file for complete search history.

(56) References Cited

U.S. PATENT DOCUMENTS

2019/0148702 A1* 5/2019 Oguma ............ H01M 10/0481
  429/121

FOREIGN PATENT DOCUMENTS

| CN | 1437277 A | 8/2003 | |
|---|---|---|---|
| CN | 103098285 A | 5/2013 | |
| EP | 1333520 B1 * | 8/2018 | ........ H01M 10/0436 |
| JP | 2004055492 A * | 2/2004 | |
| JP | 2006-252855 A | 9/2006 | |
| KR | 10-2004-0005015 A | 1/2004 | |
| KR | 100560498 B1 | 3/2006 | |

(Continued)

OTHER PUBLICATIONS

JP-2004055492-A_Machine_Translation (Year: 2004).*

(Continued)

*Primary Examiner* — Brian R Ohara
*Assistant Examiner* — Patrick Marshall Greene
(74) *Attorney, Agent, or Firm* — IP & T Group LLP

(57) ABSTRACT

Provided a battery cell having a plurality of electrodes and a battery module using the same. In order to configure the battery module only by connections of the electrodes without including a separate bus bar and improve the degree of freedom of the connections, the battery cell having cathode terminals and anode terminals protruding to the outside includes: a plurality of electrode terminals selected from the cathode terminals or the anode terminals and formed on both sides of the battery cell opposing each other. The battery cell having the plurality of electrodes and the battery module formed is various forms according to a layout of a vehicle using the same may be configured.

8 Claims, 21 Drawing Sheets

(56) References Cited

FOREIGN PATENT DOCUMENTS

| KR | 2013-0119457 A |   | 10/2013 |
|----|----------------|---|---------|
| KR | 20130119457 A  | † | 10/2013 |
| KR | 10-2014-0058058 |  | 5/2014  |
| KR | 20140058058 A  | † | 5/2014  |
| KR | 10-2014-0072698 |  | 6/2014  |
| KR | 10-2015-0109018 A |  | 10/2015 |
| KR | 101750382 B1   |   | 6/2017  |
| KR | 101783703 B1   |   | 10/2017 |

OTHER PUBLICATIONS

Office Action issued by Korean Patent Office dated Sep. 23, 2020.
Notice of Allowance issued by the Korean Intellectual Property Office dated May 25, 2021.
Office Action for Korean Patent Application No. 10-2021-0110048 issued by the Korean Intellectual Property Office dated Jul. 27, 2022.
Office Action for Chinese Patent Application No. 201910532116.2 issued by the Chinese Patent Office dated Jul. 13, 2022.

\* cited by examiner
† cited by third party

BATTERY CELL HAVING A PLURALITY OF ELECTRODES AND BATTERY MODULE USING THE SAME

CROSS-REFERENCE TO RELATED APPLICATIONS

This application claims priority under 35 U.S.C. § 119 to Korean Patent Application No. 10-2018-0070373, filed on Jun. 19, 2018, and Korean Patent Application No. 10-2019-0072890, filed on Jun. 19, 2019, in the Korean Intellectual Property Office, the disclosure of which is incorporated herein by reference in its entirety.

TECHNICAL FIELD

The following disclosure relates to a battery cell having a plurality of electrodes and a battery module using the same, and more particularly, to a battery module in which a plurality of electrodes are formed on both side ends of a secondary battery.

BACKGROUND

In recent years, a secondary battery capable of being charged and discharged has been spotlighted as a power source of an electric vehicle (EV), a hybrid electric vehicle (REV), a plug-in hybrid electric vehicle (P-HEV), or the like that has been suggested as a countermeasure for solving air pollution from an existing gasoline vehicle, diesel vehicle, or the like, using fossil fuel. Unlike small mobile devices, middle or large sized battery modules in which a large number of battery cells are connected to each other in accordance with the need for a high output and large capacity have been used in middle or large sized devices such as automobiles, and in the case of configuring various devices by applying such middle or large sized battery modules, an electrical connection structure between the unit battery modules is an important factor that whether or not it is applied is determined according to a structure of the device. For example, in a case in which a plurality of cell packs are mounted in a limited space of a platform of an electric vehicle in consideration of the electrical connection structure, there is a problem in that it is necessary to add additional parts or change a structure of a battery module coupling according to positional characteristics of electrode terminals of the respective battery modules.

In addition, there is a problem that a separate bus bar is often used when the battery modules are coupled according to the restriction of the positions of a positive terminal and a negative terminal which are final terminals of the battery module. If whether or not the bus bar is coupled is applied differently depending on the device structure in which the battery module is mounted and applied, not only productivity of the battery module assembly may be reduced but also an operation performance and driving reliability of various devices to which the battery module is to be applied are greatly affected. In addition, considering a recent trend that the field of application of the secondary battery is diversified, the necessity of improving the degree of freedom of design by the electrical connection of the battery module is increasing more and more.

Accordingly, in Korean Patent Laid-Open Publication No. 10-2014-0072698 (battery module assembly, Jun. 13, 2014), terminal portions are formed on both side ends of a bus bar applied to a battery module configured by stacking pouch-type secondary batteries having cathode and anode terminals protruding from both sides thereof to improve the conventional bus bar, thereby improving the degree of freedom of design of a connection of a plurality of battery modules. However, in the above-mentioned document, the conventional problem, of providing a separate bus bar for interconnecting the cathode and anode cells in constructing the battery module using the secondary battery having the electrodes formed one by one on both sides is not solved. In the case of the conventional battery module constituting the module by connecting the electrodes through the bus bar, a process such as welding according to a configuration of the bus bar is further required, resistance of the bus bar is increased, thereby reducing efficiency of the battery, and a quality control becomes difficult.

In order to solve the above-mentioned problem, in Korean Patent Laid-Open Publication No. 10-2014-0058058 (battery module, May 14, 2014), a cathode tab and an anode tab of a battery cell protruding outwardly are cut to connect a plurality of stacked battery modules only by the connection of the cut electrodes. However, since the battery cell in the above-mentioned document has the cathode tap and the anode tap formed only in one direction, there is a limit to the scalability of connecting a plurality of unit modules, and one cathode tab and one anode tab are cut to form a pair of cutting portions, thereby causing a structural limitation that electrodes having the same polarity should be formed to be adjacent to each other.

As such, in the conventional secondary battery, one cathode electrode or anode electrode is formed on both sides facing each other, or the cathode electrode and the anode electrode are formed on one side facing the same direction. Therefore, when the cells are connected in series with or in parallel to each other, the configuration of the battery module is limited and it is difficult to apply the battery module to various configurations according to a layout of the vehicle.

In addition, a battery module of a high-efficiency, large-capacity electric vehicle recently requires a 2P12S module formed by connecting two cells in parallel to each other and connecting 12 sets of a pair of cells connected in parallel to each other in series with each other. Such a battery module is provided by stacking batteries having one electrode formed on opposite sides thereof in one direction, and needs to additionally include a separate bus bar so that the pair of cells connected in parallel to each other is connected in series with the other pair of adjacent cells. As such, if the bus bar is additionally included, problems are caused that energy efficiency of the battery module is deteriorated due to an increase in unnecessary contact resistance between the electrodes and a process quality of the battery module is deteriorated because a consistent work process for connecting the batteries is not performed.

RELATED ART DOCUMENT

Patent Document

Korean Patent Laid-Open Publication No. 10-2014-0072698 (battery module assembly, Jun. 13, 2014)
Korean Patent Laid-Open Publication No. 10-2014-0058058 (battery module, May 14, 2014)

SUMMARY

An embodiment of the present invention is directed to providing a battery cell having a plurality of electrodes that constitutes the battery module only by connections of electrodes without including a separate bus bar and improves the degree of freedom of the connection, and a battery module using the same.

In one general aspect, a battery cell having a plurality of electrodes and a battery module using the same are provided, and more particularly, a battery cell having electrode terminals including cathode terminals and anode terminals protruding to the outside includes a plurality of electrode terminals selected from, the cathode terminals or the anode terminals and formed on both sides of the battery cell opposing each other.

The battery cell may have a plurality of cathode terminals or anode terminals formed to be adjacent to each other on both sides of the battery cell opposing each other, respectively, and having the same polarity.

The battery cell may have a pair of cathode terminals or anode terminals formed to be adjacent to each other on both sides of the battery cell opposing each other, respectively, and having different polarities.

The cathode terminals and the anode terminals formed on both sides of the battery ceil opposing each other may be disposed to have different polarities in a length direction of the battery cell.

The cathode terminals and the anode terminals formed on both sides of the battery cell opposing each other may be disposed to have the same polarity in a length direction of the batter cell.

The battery cell may have a pair of cathode terminals or anode terminals formed to be adjacent to each other on one side of the battery cell and having the same polarity, and have a pair of cathode terminals or anode terminals formed to be adjacent to each other on the other side opposing the one side and having different polarities.

In another aspect, the battery module is formed by stacking two or more battery cells, and the cathode terminals or the anode terminals adjacent to at least two or more battery cells are electrically connected to each other, wherein the battery cell may be a pouch-type secondary battery.

A plurality of cathode terminals or anode terminals having the same polarity may be formed to be adjacent to each other on both sides of the battery cells opposing each other, respectively, such that the number the groups of the plurality of battery cells connected in parallel to each other may be plural and the groups of the plurality of battery cells connected in parallel to each other may be connected in series with each other.

A plurality of battery cells having the pair of cathode terminals or anode terminals formed to be adjacent to each other on both sides of the battery cells opposing each other, respectively, and having the same polarity, and connected in parallel to each other may be connected in series with the other pair of battery cells having the pair of cathode terminals and anode terminals formed to be adjacent to each other on both sides of the battery cells opposing each other, respectively, having different polarities, and disposed to have different polarities in the length direction, and connected in parallel to each other.

The pair of cathode terminals or anode terminals having the same polarity as each other may be formed to be adjacent to each other on one side of the battery cells and the pair of cathode terminals or anode terminals having different polarities may be formed to be adjacent to each other on the other side opposing the one side, such that the number the groups of the plurality of battery cells connected in parallel to each other may be plural and the groups of the plurality of battery cells connected in parallel to each other may be connected in series with each other.

The battery module may include: a battery cell having the pair of cathode terminals or anode terminals formed to be adjacent to each other on both sides of the battery cell opposing each other and having the same polarity; and a pair of battery cells stacked on both sides of the battery cell in forward and backward directions, connected in parallel to the battery cell, and having the pair of cathode terminals or anode terminals formed to be adjacent to each other on one side of the battery cell and having the same polarity, and the pair of cathode terminals or anode terminals formed to be adjacent to each other on the other side opposing the one side and having different polarities, and the battery cell and the pair of battery cells which are connected in parallel to each other are staked in plural and are connected in series with each other.

DETAILED DESCRIPTION OF EMBODIMENTS

Since the present invention may be variously modified and have several embodiments, specific embodiments will be shown in the accompanying drawings and be described in detail. However, it is to be understood that the present invention is not limited to a specific embodiment, but includes all modifications, equivalents, and substitutions without departing from the scope and spirit of the present invention.

It is to be understood that when one element is referred to as being "connected to" or "coupled to" another element, it may be connected directly to or coupled directly to another element or be connected to or coupled to another element while having the other element interposed therebetween.

Unless being defined otherwise, it is to be understood that all the terms used in the present specification including technical and scientific terms have the same meanings as those that are generally understood by those skilled in the art.

It should be interpreted that terms defined by a generally used dictionary are identical with the meanings within the context of the related art, and they should not be ideally or excessively formally interpreted unless the context clearly dictates otherwise.

Hereinafter, a technical spirit of the present invention will be described in more detail with reference to the accompanying drawings.

The accompanying drawings are only examples illustrated in order to describe the technical idea of the present invention in more detail. Therefore, the technical idea of the present invention is not limited to forms of the accompanying drawings.

First Embodiment: Battery Cell 1-1-th Embodiment

Figure 1:
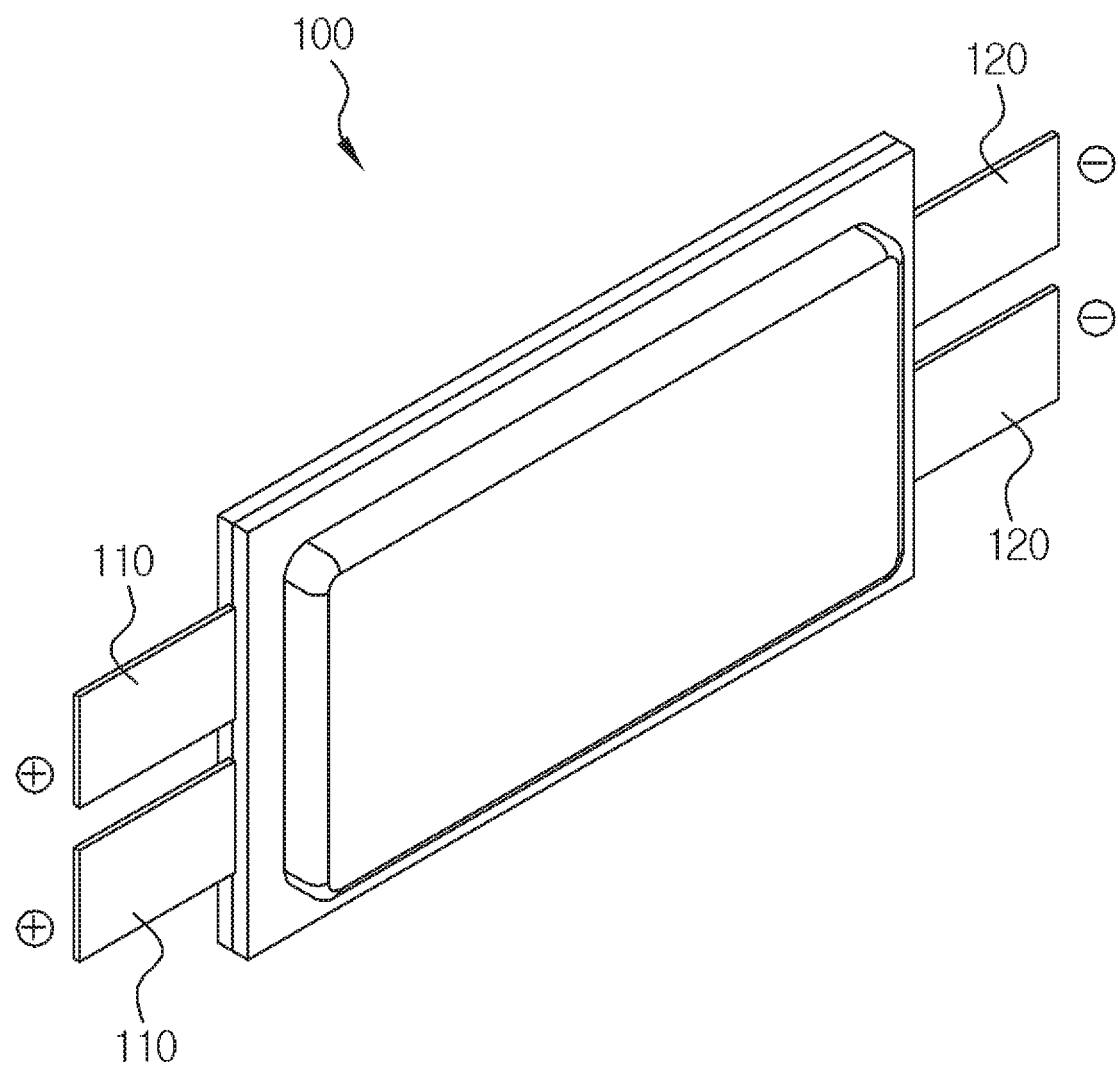
FIG. 1 is perspective views showing a battery cell according to a 1-1-th embodiment of the present invention.
Figure 2:
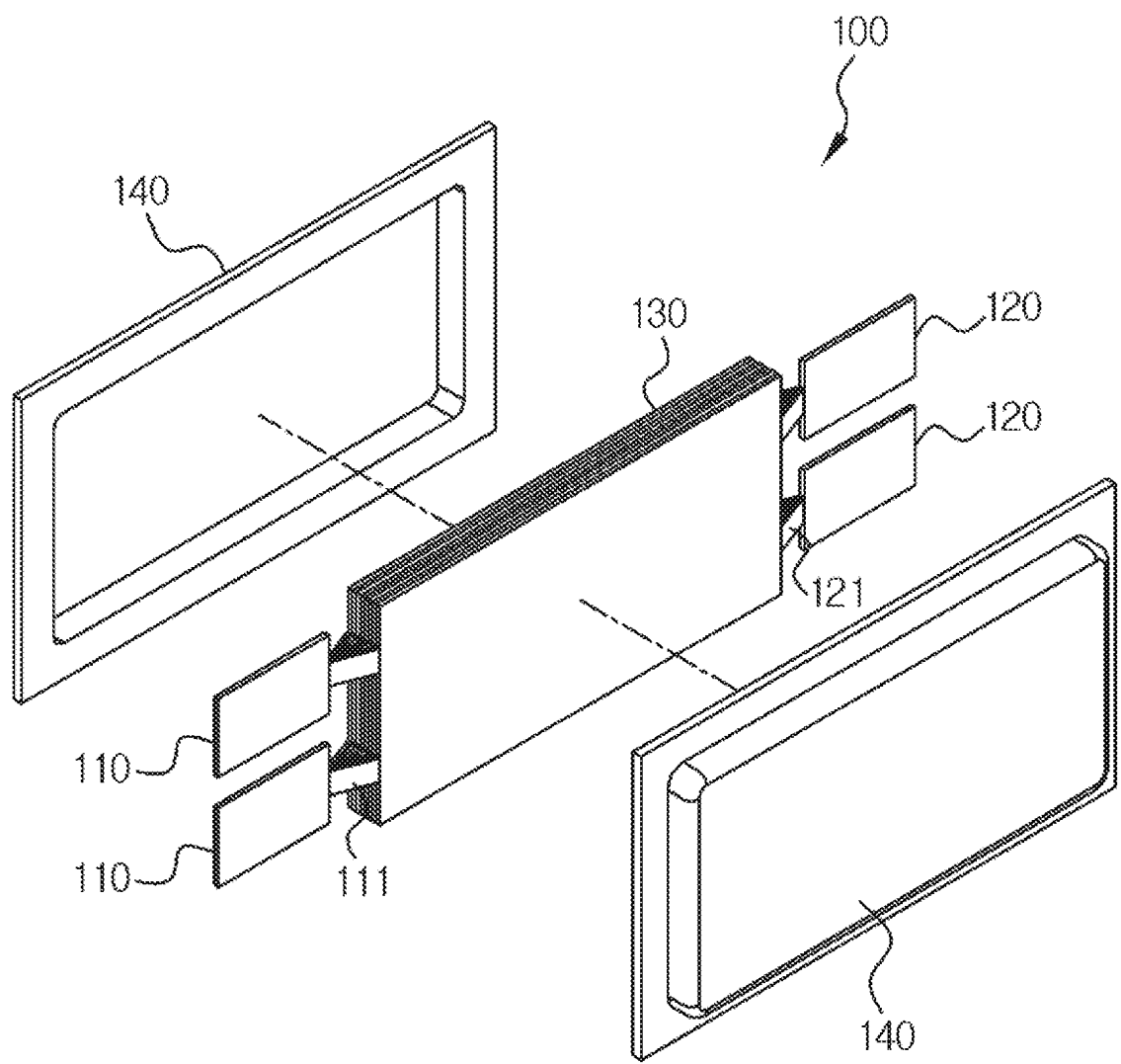
FIG. 2 is an exploded perspective view showing the battery cell according to FIG. 1.

FIG. 1 is a perspective view showing a battery cell 100 according to a 1-1-th embodiment of the present invention and FIG. 2 is an exploded perspective view of the battery cell 100 according to FIG. 1. Referring to FIGS. 1 and 2, the battery cell 100 may include cathode terminals 110, anode terminals 120, an electrode assembly 130, and external cases 140.

The electrode assembly 130 may be configured such that one or more cathode plates and anode plates are disposed while having a separator interposed therebetween, and may be divided into a winding type in which one cathode plate and one anode plate are wound together with the separator, or a stacked type in which a plurality of cathode plates and a plurality of anode plates are alternately stacked while having the separator interposed therebetween. In this case, the battery cell 100 may be formed as a battery-type or pack-type primary cell or secondary cell, and may be preferably formed as a pouch type stacked secondary battery in which the cathode terminal 110 and the anode terminal 120 are formed to be erected in a vertical direction on both sides thereof opposing each other in a horizontal direction.

In addition, the external cases 140 may be configured to include an external insulating layer, a metal layer, and an internal adhesive layer, and may thus accommodate internal components such as the electrode assembly 130, an electrolyte, and the like. In this case, in order to improve supplementation and heat dissipation property for electrical and chemical properties by the electrode assembly 130 and the electrolyte, a metal thin film of aluminum type is interposed between the insulating layer and the internal adhesive layer and is provided on both sides in a stacked direction of the electrode assembly 130 to receive the electrode assembly 130. A sealing portion may be provided on external circumferential surfaces of the external cases 140 to seal the external case 140 accommodating the electrode assembly 130. In addition, at least one of the external cases 140 may protrude in a concave shape in the stacked direction of the electrode assembly 130.

In addition, each electrode plate of the electrode assembly 130 is provided with an electrode tab, and one or more electrode tabs may function as electrode terminals of the battery cell 100 by being connected to the respective cathode and anode plates, interposed between the sealing portions of the external case 140, and protruding outwardly. In addition, a plurality of electrode tabs 111 and 121 for each connecting the cathode plate or the anode plate to one surface on which the electrode terminals of the electrode assembly 130 are formed are formed such that the battery cell 100 may have the cathode terminals 110 and the anode terminals 120 protruding externally from the external case 140 in the length direction, and may have one or more selected from the cathode terminals 110 and the anode terminals 120 formed on both sides thereof opposing each other.

In more detail, in the battery cell 100 according to the 1-1-th embodiment of the present invention, the cathode plate having the cathode tabs formed to be adjacent to one side in the length direction thereof and the anode plate having the anode tabs 121 formed to be adjacent to one side in the length direction thereof are stacked on each other. In this case, the cathode tabs 111 of the cathode plate and the anode tabs 121 of the anode plate are stacked to have directions opposing each other in the length direction such that a pair of cathode terminals 110 or anode terminals 120 having the same polarity is each formed to be adjacent to each other. Therefore, the pair of cathode terminals 110 may be formed on one side in the length direction and the pair of anode terminals 120 may be disposed on the other side in the length direction.

Further, the battery cell 100 may have three or more cathode terminals 110 and anode terminals 120 formed on both sides thereof opposing each other, if necessary, and unnecessary electrode terminals may be removed at the time of designing the battery module constituted by stacking the battery cells 100. However, it is preferable that the pair of electrode terminals 110 and 120 is formed on both sides of the battery cell 100 opposing each other, respectively, so that the unnecessary electrode terminals are not formed at the time of connecting the battery cells 100 and a high degree of freedom is provided.

1-2-th Embodiment

Figure 3:
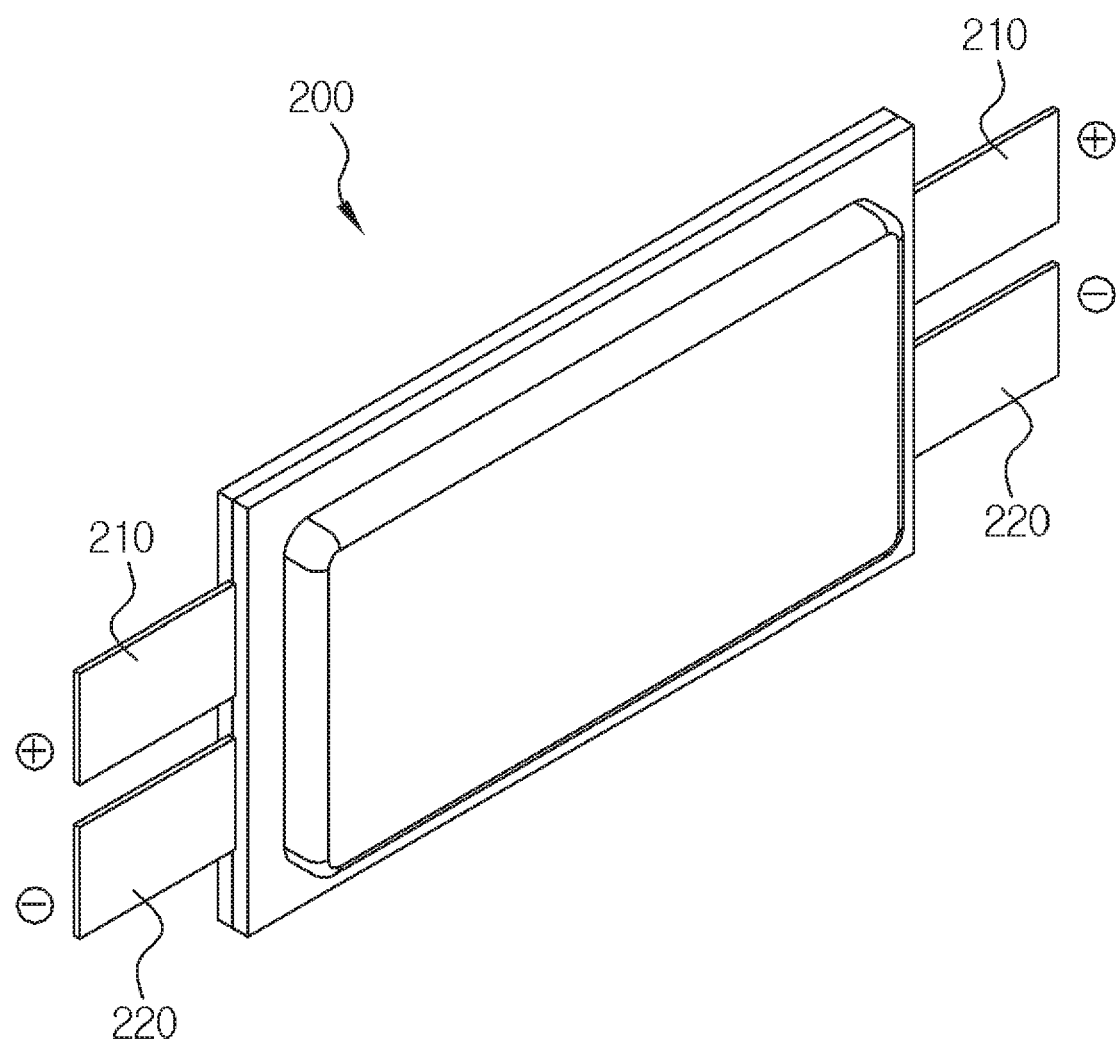
FIG. 3 is a perspective view showing a battery cell according to a 1-2-th embodiment of the present invention.

FIG. 3 is a perspective view showing a battery cell 200 according to a 1-2-th embodiment of the present invention. As shown in FIG. 3, the battery cell 200 according to the 1-2-th embodiment of the present invention is configured so that a pair of cathode terminals 210 and anode terminals 220 having different polarities is formed to be adjacent to each other on both side thereof opposing each other, respectively, and is disposed to have the same polarity on both sides of the battery cell 200 opposing each other in a length direction of the battery cell 200.

In this case, in the battery cell 200, a cathode plate and an anode plate each having a pair of electrode tabs formed on both sides thereof opposing each other in the length direction are stacked on each other, and the respective cathode and anode tabs formed on the cathode plate and the anode plate may be disposed and stacked so as not to interfere with each other in the stacked direction.

1-3-th Embodiment

Figure 4:
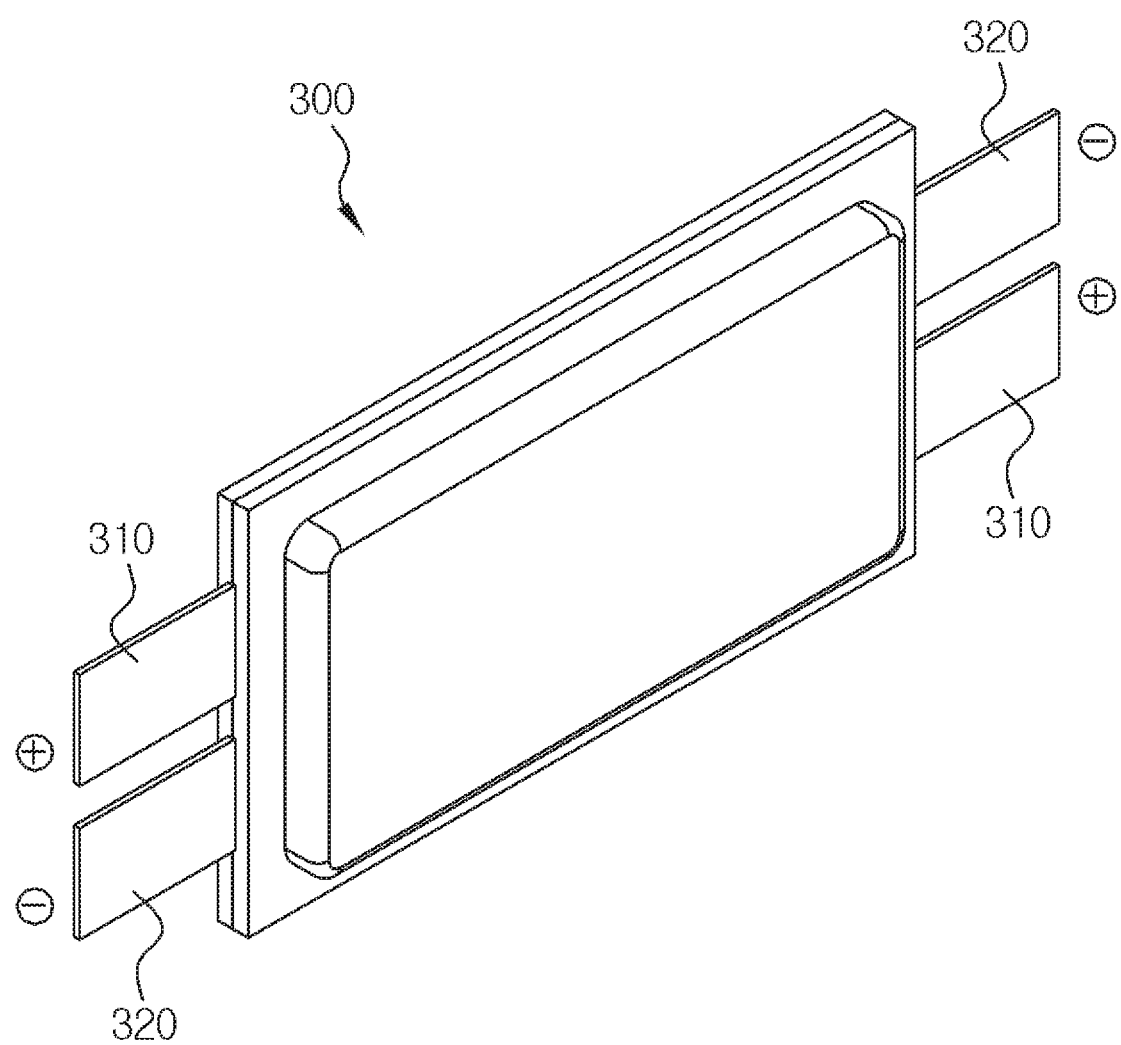
FIG. 4 is a perspective view showing a battery cell according to a 1-3-th embodiment of the present invention.

FIG. 4 is a perspective view showing a battery cell 300 according to a 1-3-th embodiment of the present invention. Referring to FIG. 4, the battery cell 300 according to the 1-3-th embodiment of the present invention is configured so that a pair of cathode terminals 310 and anode terminals 320 having different polarities is formed to be adjacent to each other on both sides thereof opposing each other, respectively, and is disposed to have different polarities on both sides of the battery cell 300 opposing each other in a length direction of the battery cell 300.

In this case, in the battery cell 300, a cathode plate and an anode plate on which a pair of electrode tabs opposing each other in a corner direction are formed on a rectangular electrode plate are stacked on each other. In this case, it is preferable that the stacked cathode and anode tabs are disposed and formed so as not to interfere with each other in the stacked direction.

1-4-th and 1-5-th Embodiments

Figure 5:
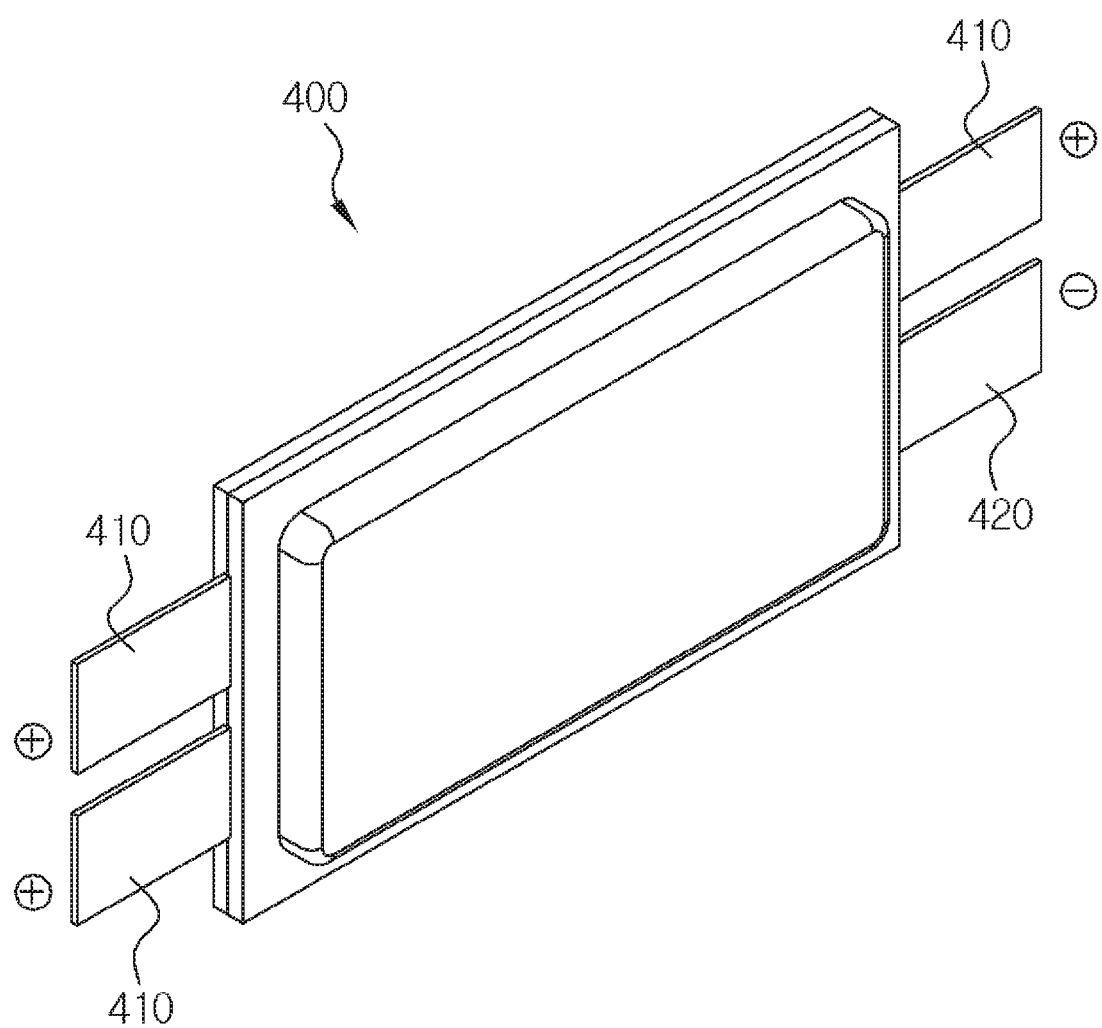
FIG. 5 is a perspective view showing a battery cell according to a 1-4-th embodiment of the present invention.
Figure 6:
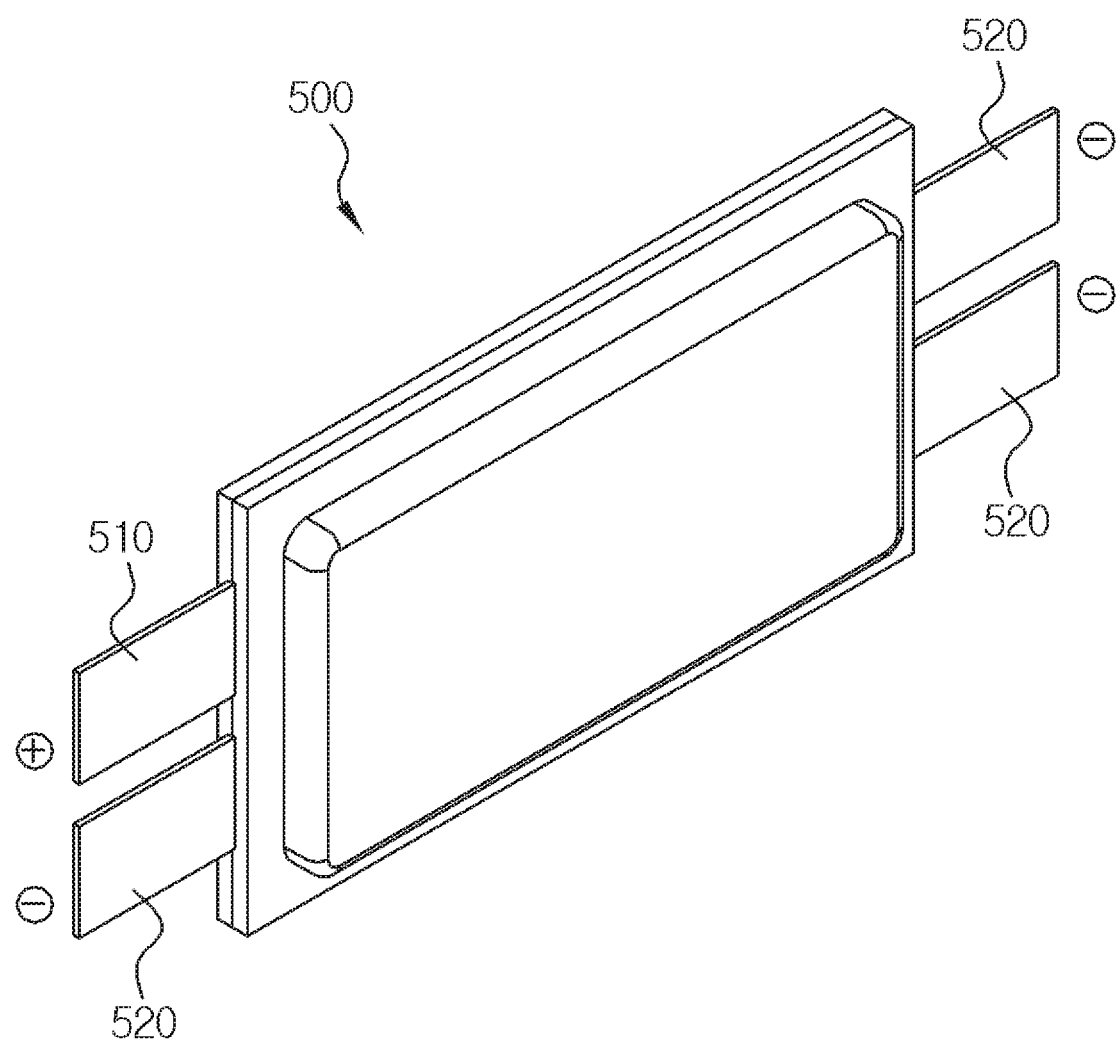
FIG. 6 is a perspective view showing a battery cell according to a 1-5-th embodiment of the present invention.

FIG. 5 is a perspective view showing a battery cell 400 according to a 1-4-th embodiment of the present invention and FIG. 6 is a battery cell 500 according to a 1-5-th embodiment of the present invention. The battery cells 400 and 500 according to the 1-4-th and 1-5-th embodiments of the present invention may be configured so that a pair of cathode terminals 410 and 510 or anode terminals 420 and 520 having the same polarity is formed to be adjacent to each other on one side thereof and the pair of cathode terminals 410 and 510 or anode terminals 420 and 520 having different polarities is formed to be adjacent to each other on the other side opposing the one side. In this case, the battery cells 400 and 500 may be manufactured by forming and stacking a plurality of electrode tabs on one electrode plate to form the respective cathode terminals 410 and 510 or anode terminals 420 and 520, or may be manufactured by being stacked so as to form the plurality of terminals through an arrangement of the electrode plate on which at least one electrode tab is formed in a direction in which the electrode tab protrudes.

In addition, as shown in FIG. 5, the battery cell 400 according to the 1-4-th embodiment has a pair of cathode terminals 410 formed on one side thereof and a pair of cathode terminal 410 and anode terminal 420 formed on the other side opposing the one side in a length direction. Since the battery cell 400 according to the configuration described above includes three cathode terminals 410, the degree of freedom of a connection with other battery cells stacked to be adjacent to each other may be increased.

In addition, as shown in FIG. 6, the battery cell 500 according to the 1-5-th embodiment has a pair of anode terminals 520 formed on one side thereof in a length direction and a pair of cathode terminal 510 and anode terminal 520 formed on the other side opposing the one side. In this case, since the battery cell 500 according to the configuration described above includes three anode terminals 520, the degree of freedom of a connection with other battery cells stacked to be adjacent to each other may be increased.

Further, according to various embodiments of the present invention, a plurality of battery cells having a plurality of electrode terminals arranged thereon may be stacked to configure one unit module, and depending on a required specification of each unit module, the battery cell having various arrangements may be used. In this case, the battery cell has an advantage having a high degree of freedom capable of designing the battery module according to a layout of the vehicle, at the time of designing the battery module by using the battery cells having various directions or the arrangements of the electrode terminals according to the number and capacity of the battery cells required for a unit module configured by the series or parallel connection with the adjacent battery cell.

Second Embodiment: Battery Module

In the following, battery modules 1000, 2000, 3000, and 4000 constituting one stacked module using the battery cells 100, 200, 300, 400, and 500 according to various embodiments of the present invention will be described.

Figure 7:
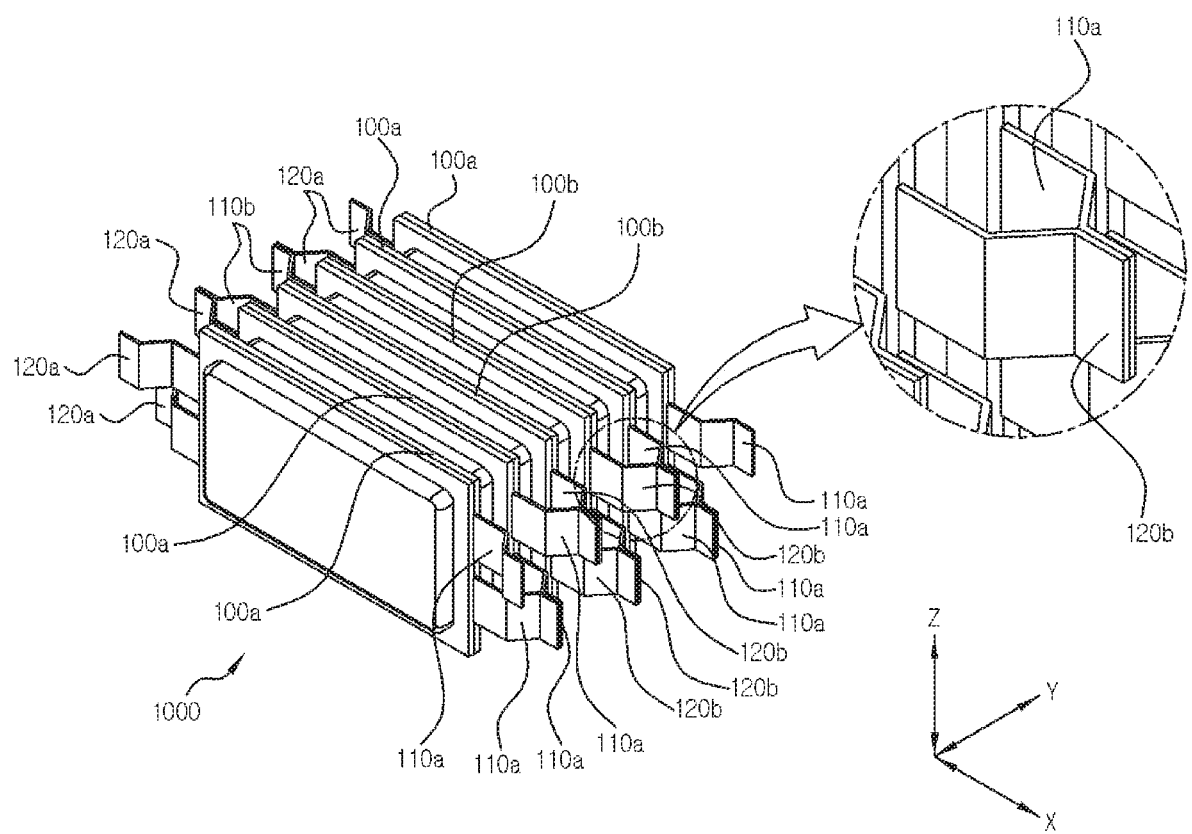
FIG. 7 is a perspective view showing a battery module according to a 2-1-th embodiment of the present invention.

In addition, as shown in FIG. 7, at least two battery cells 100 according to the above-mentioned configuration are stacked so that a battery module 1000 in which the cathode terminals 110 and the anode terminals 120 of the battery cells 100 adjacent to each other are electrically connected to each other may be configured. Meanwhile, the electrode terminals of the battery cells 100 are formed on both sides thereof in a horizontal direction thereof in the form in which the battery cells 100 are vertically erected on a ground so that broad surfaces of the battery cells 100 face forward and backward directions. A direction of the battery cells 100 arranged to be stacked in the forward and backward directions is defined as a y axis, a length direction of the left and right sides of the battery cells 100 is defined as an x axis, and a height direction in which the electrode terminals 110 and 120 are disposed to be adjacent to each other on the left and right sides of the battery cells 100 is defined as a z axis.

Referring to FIG. 7, the battery module 1000 may be configured by arranging the broad surfaces of the battery cells 100 to face each other in the y axis direction. In this case, the battery module 1000 has an advantage in that various components of the battery cells 100 in the same direction may be modularized without using a separate bus bar because the cathode terminals 110 or the anode terminals 120 are electrically connected to each other. In this case, the electrical connection between the cathode terminals 110 and the anode terminals 120 may electrically connect the respective battery cells 100 to each other because the respective electrode terminals 110 and 120 are bent and are in contact with the electrode terminals 110 and 120 of another battery cell 100 disposed to be adjacent to the battery module 100 as shown in FIG. 7. The contacted electrode terminals 110 and 120 may be welded or may further include a protective case (not shown) surrounding the battery module 1000 to protect unnecessary contact between the electrodes and damage from the outside.

According to the configuration described above, the battery module 1000 according to the present invention may improve the degree of freedom of the stacked direction, a shape of the battery module, and the connection of the electrodes at the time of designing the battery module 1000 by forming the plurality of electrode terminals 110 and 120 on both sides opposing each other. Compared with an angled battery cell in which a constant shape is required to be maintained, the battery module 1000 according to the present invention has an advantage in that it may be configured in various forms according to the layout of the vehicle, because its shape is manufactured in various pouch type secondary batteries.

Figure 8:
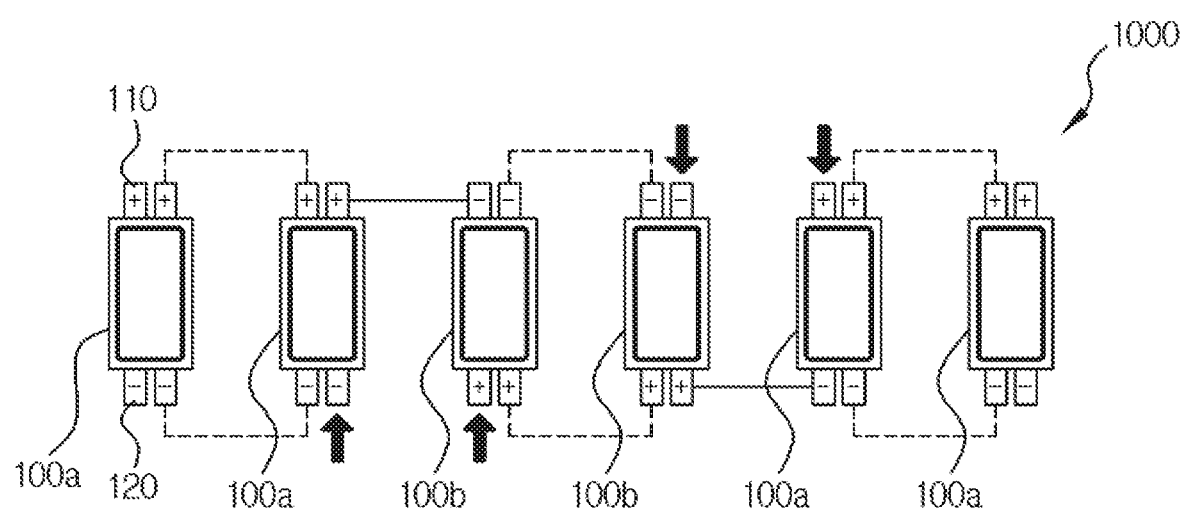
FIG. 8 is a schematic view showing the battery module according to the 2-1-th embodiment of the present invention.

In addition, the battery module 1000 according to the present invention may be configured so that a plurality of cathode terminals 110 and anode terminals 120 are formed in directions opposing each other and the battery cells 100 are thus connected in series with and in parallel to each other in one direction. If necessary, as shown in FIGS. 7 and 8, the battery cells 100 may be stacked in the x axis direction to configure the battery module 1000. In this case, the cathode terminals 110 or the anode terminals 120 of the battery cells 100 connected to each other in the x axis direction are bent and connected at a predetermined angle in directions corresponding to each other in the y axis direction. In this case, the angle at which the electrode terminals 110 and 120 are bent, is caused by a thickness of the electrode terminals 110 and 120 and an arrangement of the battery cells 100.

In addition, the battery module 1000 may be formed by connecting the cathode terminals 110 and the anode terminals 120 formed on both sides of the battery cell 100 in series with or in parallel to each other according to the form of the electrode terminals 110 and 120 disposed on the battery cells 100. The battery module 1000 may be configured according to various combinations of the battery cells 100 according to the embodiments of the present invention, according to the design conditions of the battery module 1000.

2-1-th Embodiment

Hereinafter, in an embodiment of the present invention, a battery module for manufacturing a 2P12S module formed by connecting two battery cells required for a high-efficiency large-capacity electric vehicle in parallel to each other and connecting 12 sets of a pair of cells connected in parallel to each other in series with each other is presented. In this case, the battery module may form various modules according to a combination in which the cathode terminals and the anode terminals formed on both sides of the battery cell opposing each other are disposed. In the following, the battery module formed by connecting two battery cells in parallel to each other and connecting a pair of battery cells connected in parallel to each other in series with each other will be described in detail.

FIG. 7 is a perspective view showing a portion of the battery module 1000 according to the 2-1-th embodiment of the present invention and FIG. 8 is a schematic view showing a portion of the battery module 1000 according to the 2-1-th embodiment of the present invention. Referring to FIGS. 7 and 8, it is shown that the battery module 1000 is formed by forming a pair of cathode terminals 110 or anode terminals 120 having the same polarity on both sides of the battery cells opposing each other, respectively, to be adjacent to each other and a pair of battery cells 100a connected in parallel to each other with the other pair of adjacent battery cells 100b in series. In the FIGS. 7 and 8, the two battery cells 100a are connected in parallel to each other and 3 SETs of the pair of the battery cells 100a connected in parallel to each other are connected in series with each other. However, the present invention is not limited to the number of connected battery cells. It is preferable to configure the battery module 1000 by stacking a plurality of battery cells without departing from the gist of the present invention.

In this case, in order to connect the pair of battery cells 110a connected in parallel to each other with the other pair of adjacent battery cells 100b in series, the battery module 1000 stacked in one direction may be configured by rotating the other pair of battery cells 100b disposed to be adjacent to the pair of battery cells 100a so that a direction of the electrodes connected in series with each other is the same as each other in a length direction (x axis) with respect to a thickness direction (y axis) to invert the direction in which the electrodes face and disposing the other pair of battery cells 100b. In this case, when the battery cells 100b are rotated in the length direction (x axis) and inverted for series connection as described above, a direction in which the cathode plate and the anode plate are stacked according to the stacked direction of the battery cells 100b is not inverted. However, when the battery cells 100b is rotated in the thickness direction (y axis) with respect to the length direction (x axis), the direction in which the cathode plate and the anode plate are stacked is inverted, which may cause performance and safety problems. In more detail, when the direction in which the cathode plate and the anode plate are stacked is changed, a movement path of negative charges moving in the battery cell may be changed. Therefore, the cathode plate and the anode plate need to have perfect symmetry with each other and the separator interposed between the cathode plate and the anode plate may be defective, which may cause a problem of direct connection to an explosion of the battery.

In addition, as shown in FIG. 8, at the time of configuring the battery module 1000, since the pair of battery cells 100a may be sufficiently connected in series with the other pair of adjacent battery cells 100b only by the connection of one cathode plate and one anode plate, it is preferable to configure the battery module 1000 by cutting off unused unnecessary cathode and anode terminals 110 and 120 or covering unnecessary terminals with a protective cap.

2-2-th Embodiment

Figure 9:
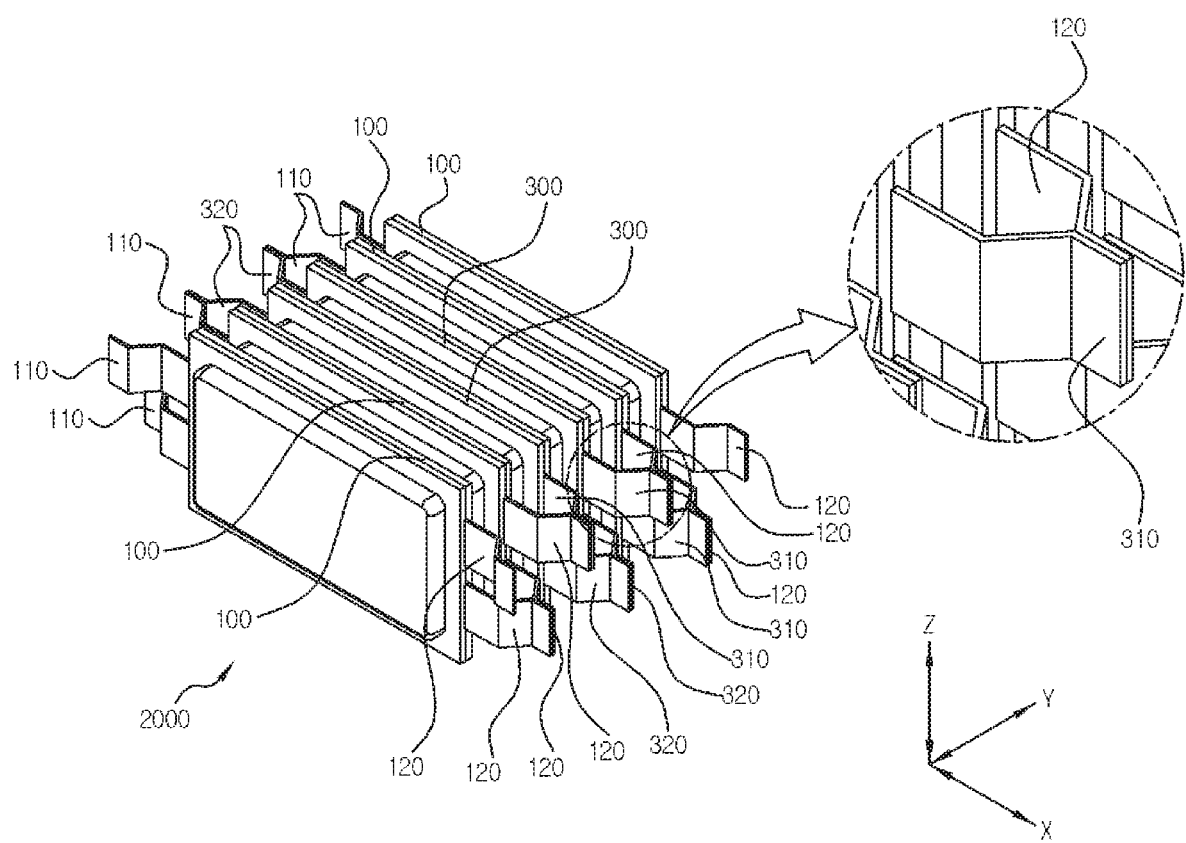
FIG. 9 is a perspective view showing a battery module according to a 2-2-th embodiment of the present invention.
Figure 10:
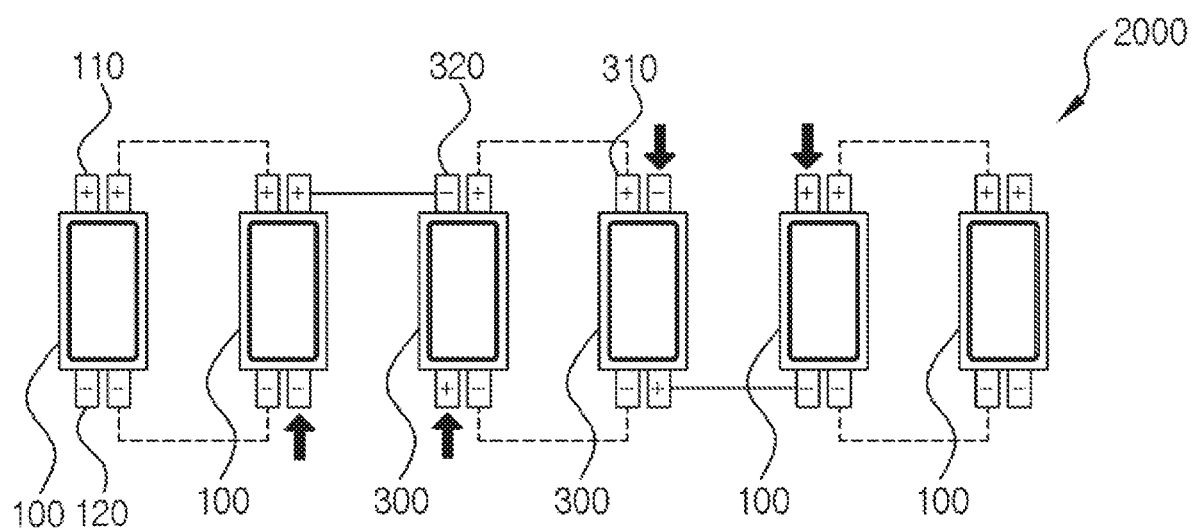
FIG. 10 is a schematic view showing the battery module according to the 2-2-th embodiment of the present invention.

FIG. 9 is a perspective view showing a portion of the battery module 2000 according to a 2-2-th embodiment of the present invention and FIG. 10 is a schematic view showing a portion of the battery module 2000 according to the 2-2-th embodiment of the present invention. Referring to FIGS. 9 and 10, it is shown that the battery module 2000 is configured by connecting a pair of battery cells 100 connected in parallel to each other by forming a pair of cathode terminals 110 or anode terminals 120 having the same polarity on both sides of the battery cells opposing each other, respectively, to be adjacent to each other with the other pair of battery cells 300 connected in parallel to each other by forming a pair of cathode terminals 310 and anode terminals 320 having different polarities on both sides of the battery cells opposing each other, respectively, to be adjacent to each other and disposed to have different polarities in the length direction in series. In this case, there is an advantage that it is not necessary to invert the directions of the battery cells 100 and 300 in order to align the directions between the electrode terminals 310 and 320 of the other pair of battery cells 300 connected in series with the pair of battery cells 100.

2-3-th Embodiment

In the 2-1-th and 2-2-th embodiments described above, one battery module is formed by stacking the plurality of battery cells. In this case, electrodes which are not connected to the adjacent battery cells at an end portion of the stacked direction (y axis) of the battery cells serve as external terminals for connection in a direction different from the stacked direction (y axis) of the battery cells. In this case, in the battery module, the terminals having the same polarity are formed on both ends in the stacked direction (y axis) and the electrodes having different polarities are formed in the length direction (x axis) of the battery cells. In this case, the battery modules 1000 and 2000 according to the 2-1-th and 2-2-th embodiments have an advantage that the battery modules are easily connected in parallel to each other in the length direction (x axis, see FIG. 16) of the battery cells. However, at the time of series connection in which different polarities need to be connected to each other, since the same terminals as each other are formed to face the same direction, there arises a problem that any one of the terminals needs to be cut or insulated.

In the following, in order to solve the problem described above, a battery module in which external terminals having the same polarity in the length direction (x axis) of the battery cells) are formed will be present.

Figure 11:
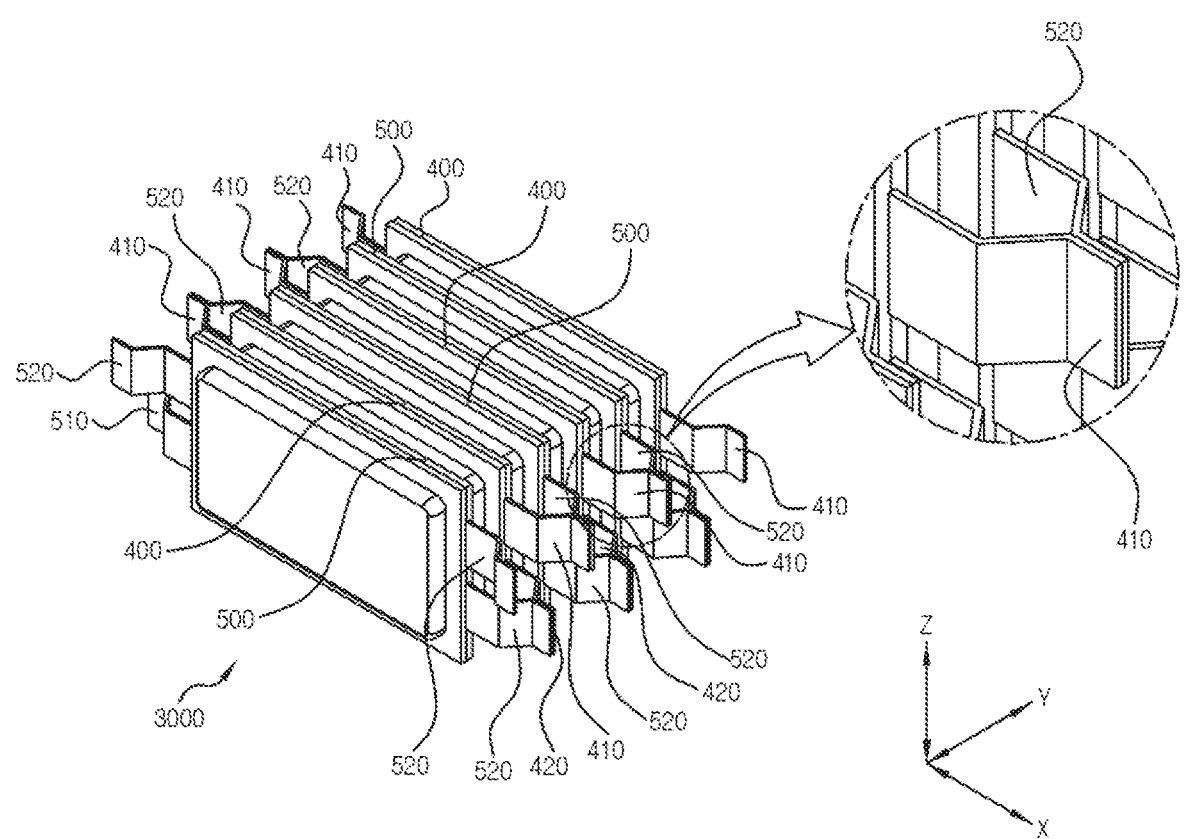
FIG. 11 is a perspective view showing a battery module according to a 2-3-th embodiment of the present invention.
Figure 12:
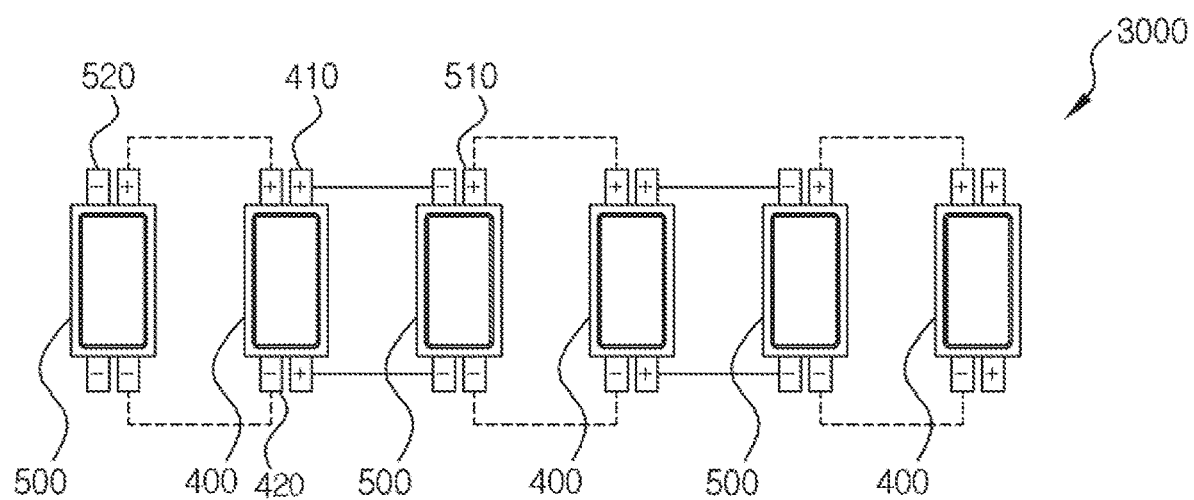
FIG. 12 is a schematic view showing the battery module according to the 2-3-th embodiment of the present invention.

FIG. 11 is a perspective view showing a battery module according to a 2-3-th embodiment of the present invention and FIG. 12 is a schematic view showing the battery module according to the 2-3-th embodiment of the present invention. Referring to FIGS. 11 and 12, in a battery module 3000 according to a 2-3-th embodiment of the present invention, a pair of battery cells 400 and 500 connected in parallel to each other having a pair of cathode terminals 510 or anode terminals 520 formed to be adjacent, to each other on one side thereof and having the same polarity and the pair of cathode terminals 510 or the anode terminals 520 formed to be adjacent to each other on the other side opposing the one side in the length direction and having different polarities may be connected in series with the other pair of adjacent battery cells 400 and 500. In this case, the battery cells 400 and 500 may be disposed to have only one electrode terminal 420 and 510 having different polarities and may have the electrode terminals having the same polarity disposed in the corresponding direction, and the other pair of battery cells 400 and 500 connected in series with each other may be disposed so that the electrode terminals having different polarities correspond to each other, thereby making it possible to perform a consistent modularization process.

2-4-th Embodiment

Figure 13:
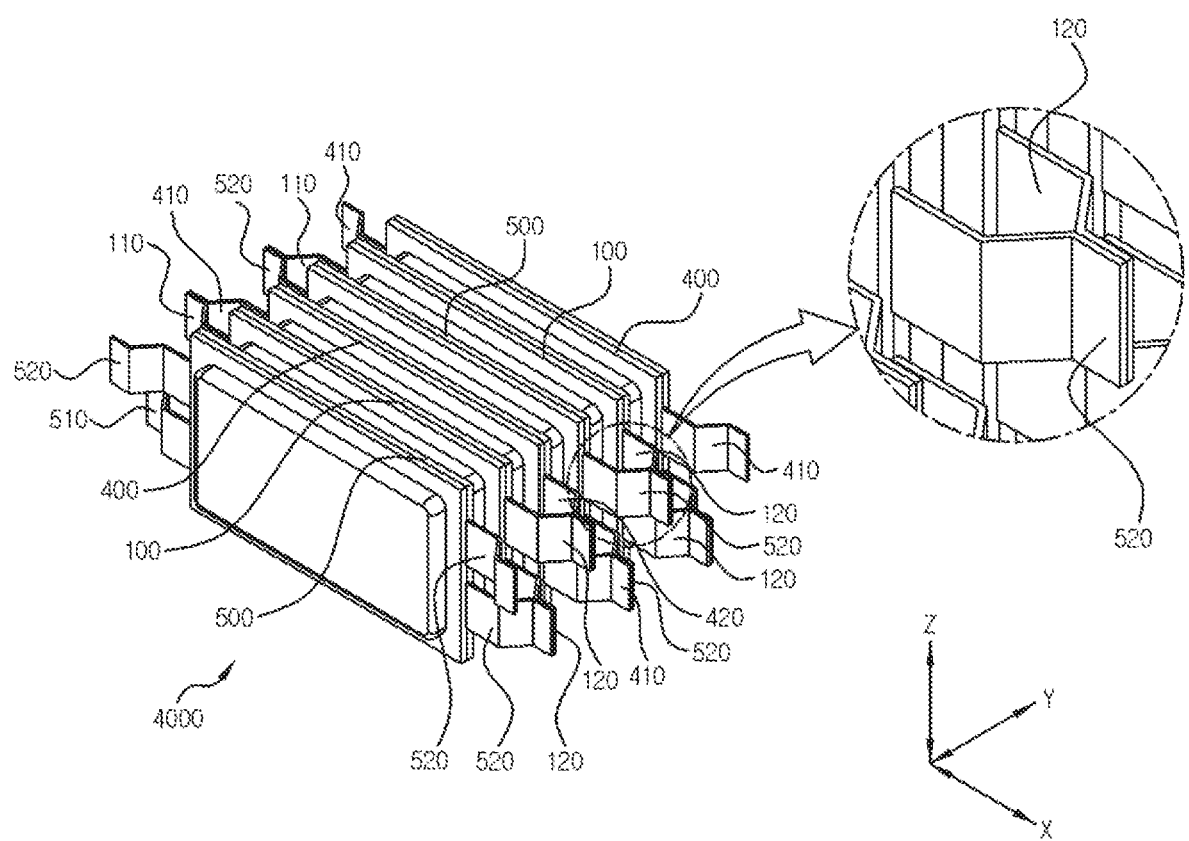
FIG. 13 is a perspective view showing a battery module according to a 2-4-th embodiment of the present invention.
Figure 14:
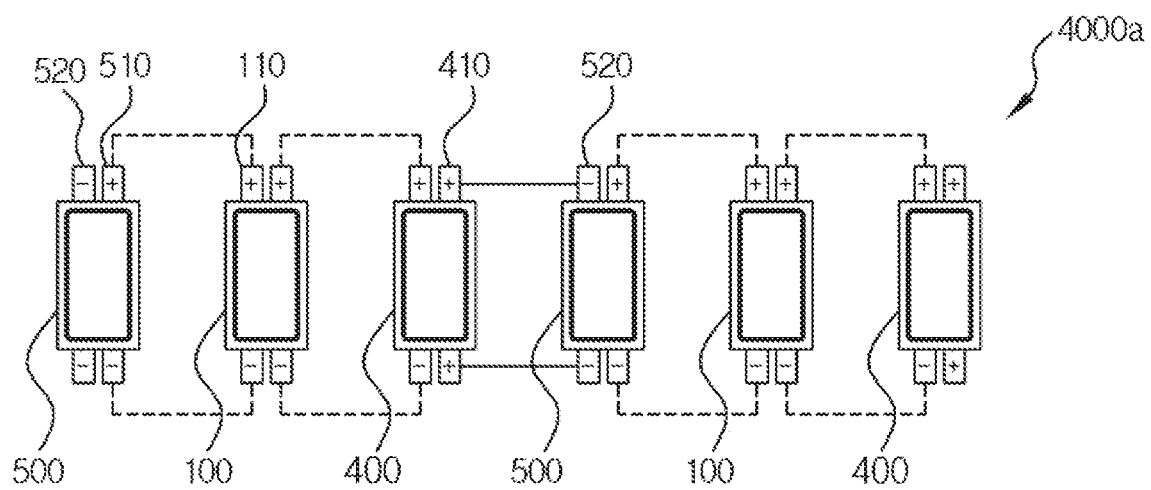
FIGS. 14 and 15 are schematic views showing a battery module according to the 2-4-th embodiment of the present invention.
Figure 15:
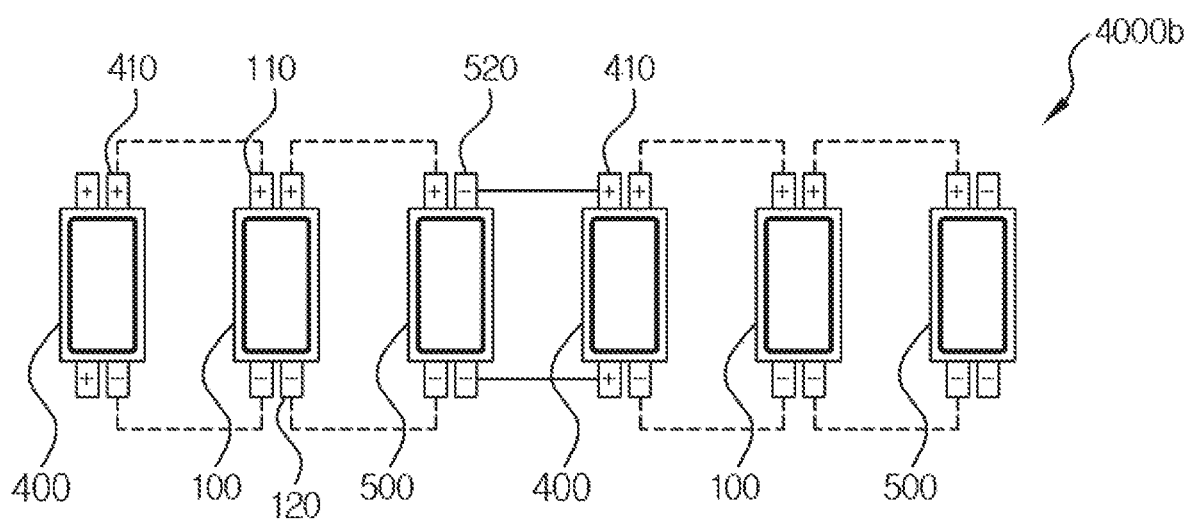

As another aspect of the present invention, in the following, a battery module 4000 forming a 3P8S module by connecting three battery cells in parallel to each other and connecting 8 sets of the three battery ceils connected in parallel to each other in series with each other will be FIG. 13 is a perspective view showing a battery module according to a 2-4-th embodiment of the present invention and FIGS. 14 and 15 are schematic views showing the battery module according to the 2-4-th embodiment of the present invention. Referring to FIGS. 13 to 15, a battery module 4000 according to a 2-4-th embodiment of the present, invention includes battery cell 100 having a pair of cathode terminals 110 or anode terminals 120 formed to be adjacent to each, other on both sides opposing each other in the length direction and having the same polarity, and a pair of battery cells 400 and 500 stacked on both sides in the stacked direction of the battery cell 100, connected in parallel to the battery cell 100, and having a pair of cathode terminals 410 and 510 or anode terminals 420 and 520 formed to be adjacent to each other on one side and having the same polarity and a pair of cathode terminals 410 and 510 or anode terminals 420 and 520 formed to be adjacent to each other on the other side opposing the one side and having different polarities, wherein the battery cell 100 and the pair of battery cells 400 and 500 which are connected in parallel to each other are stacked in plural and are connected in series with each other to configure the battery module 4000.

In this case, the battery module 4000 may include a battery module 4000a in which the battery cells are connected in parallel to each other in the order of 500-100-400 as shown in FIG. 14, and a battery module 4000b in which the battery cells are connected in parallel to each other in the order of 400-100-500 as shown in FIG. 15. Here, the battery module 4000a and the battery module 4000b are manufactured in a shape in which the direction of the electrode terminals forming the external terminals is inverted. Since the external terminals of the battery modules 3000 and 4000 according to the 2-3-th and 2-4-th embodiments have different polarities formed on both ends in the stacked direction (y axis), there rises a problem that the direction in which the cathode plate and the anode plate are stacked is inverted in order to invert the polarities of the external electrodes. Therefore, two battery modules 4000a and 4000b having an inverted electrode direction of the external electrodes may be manufactured by changing the order of the battery cells 400 and 500 connected in parallel to each other.

Further, without departing from the scope of the present invention, in the battery module according to the present invention, a single battery module may be formed by connecting a plurality of battery cells connected in parallel to each other in series with each other. More specifically, at least two or more battery cells are stacked such that the cathode terminals or anode terminals adjacent to each other and having the same polarity are connected in parallel to each other, at least two or more battery cells connected in parallel to each other are stacked in plural, and the other of a plurality of stacked at least two or more battery cells connected in parallel to each other stacked to be adjacent to one of the plurality of stacked at least two or more battery cells connected in parallel to each other has the cathode terminals and anode terminals adjacent to each other being connected in series with each other, thereby making it possible to configure various standards of battery modules.

Figure 16:
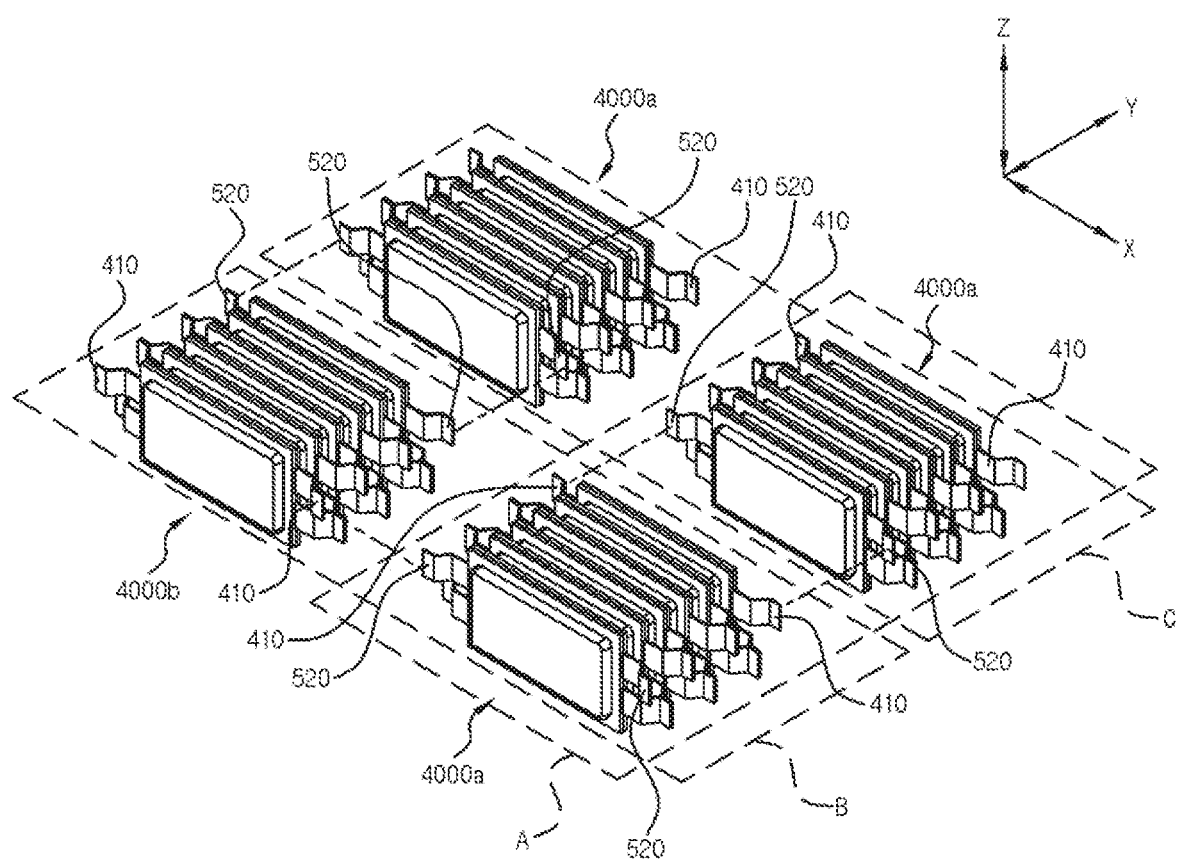
FIGS. 16 and 17 are illustrative views showing a coupling between the battery modules according to a second embodiment, of the present invention.
Figure 17:
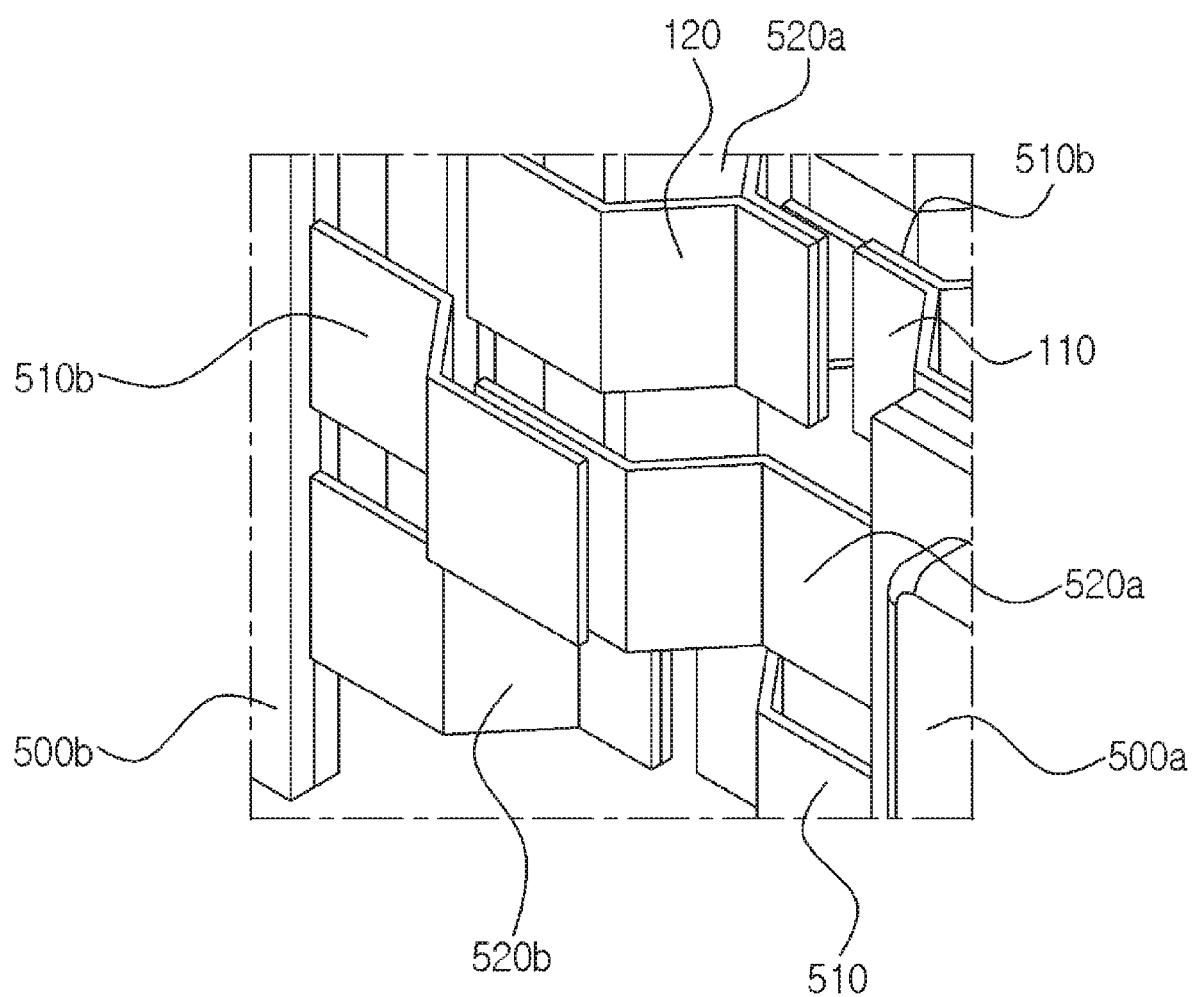
Figure 18:
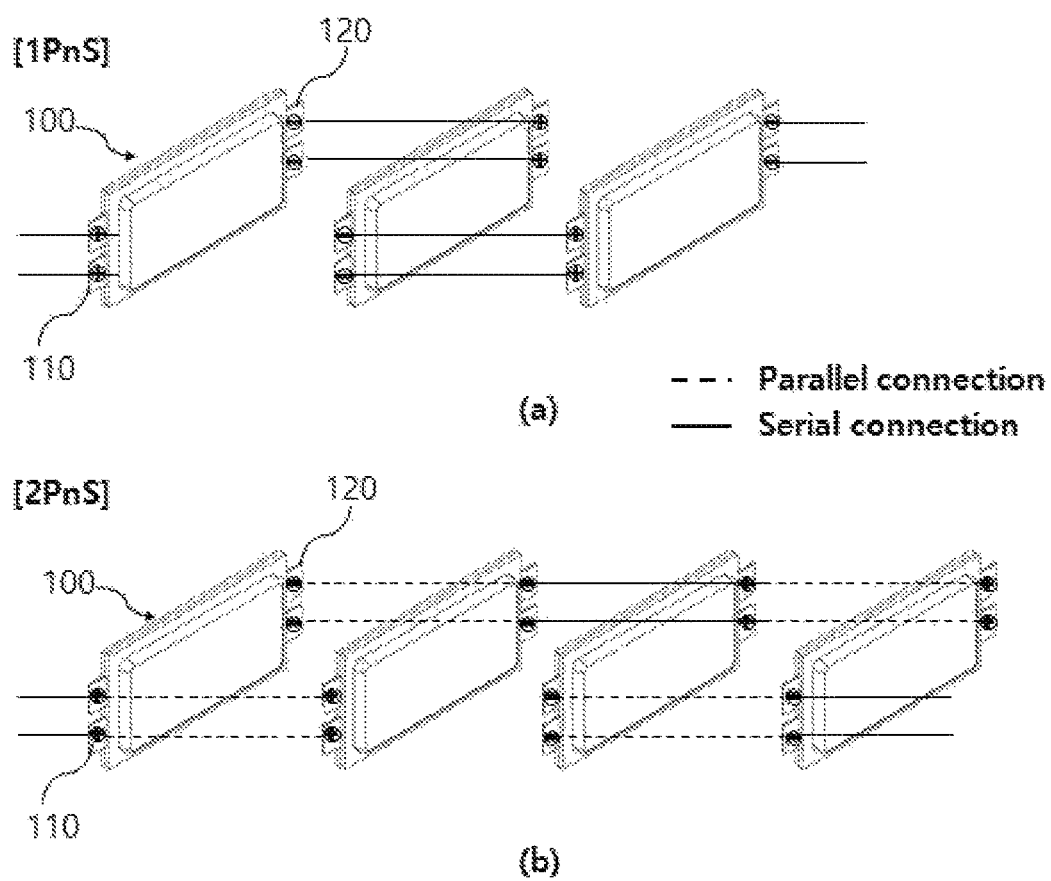
FIGS. 18 to 21 are views for describing an aspect of the present invention in which terminals adjacent to each other are connected to each other using an external bus bar.
Figure 19:
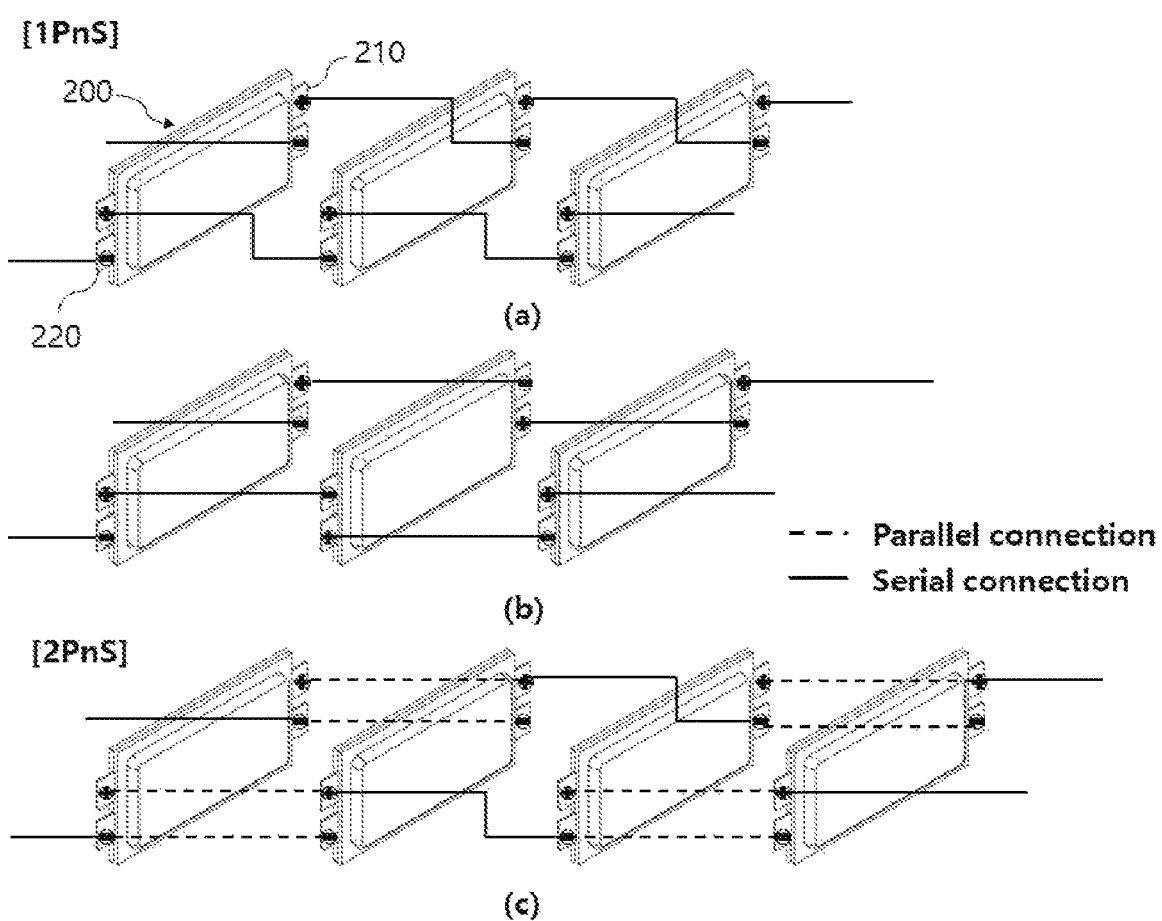
Figure 20:
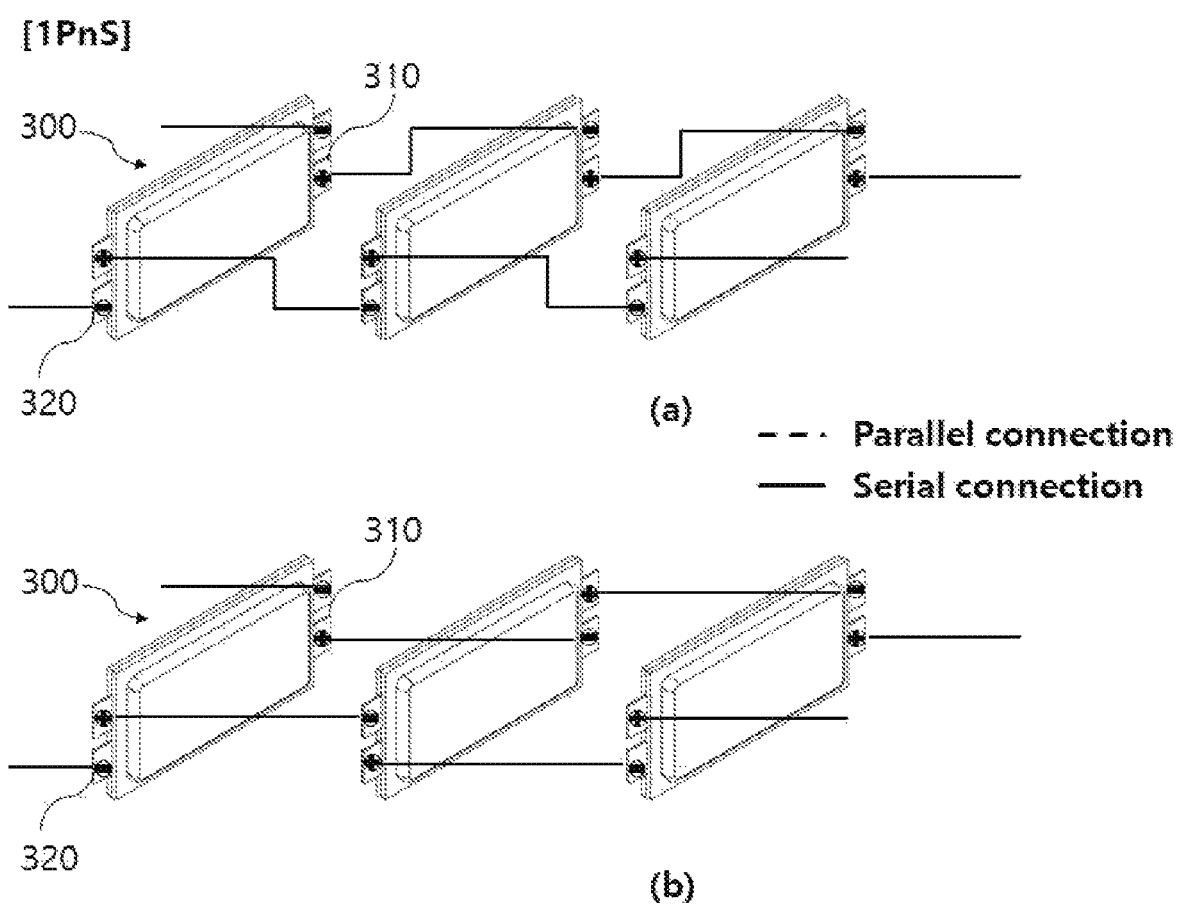
Figure 21:
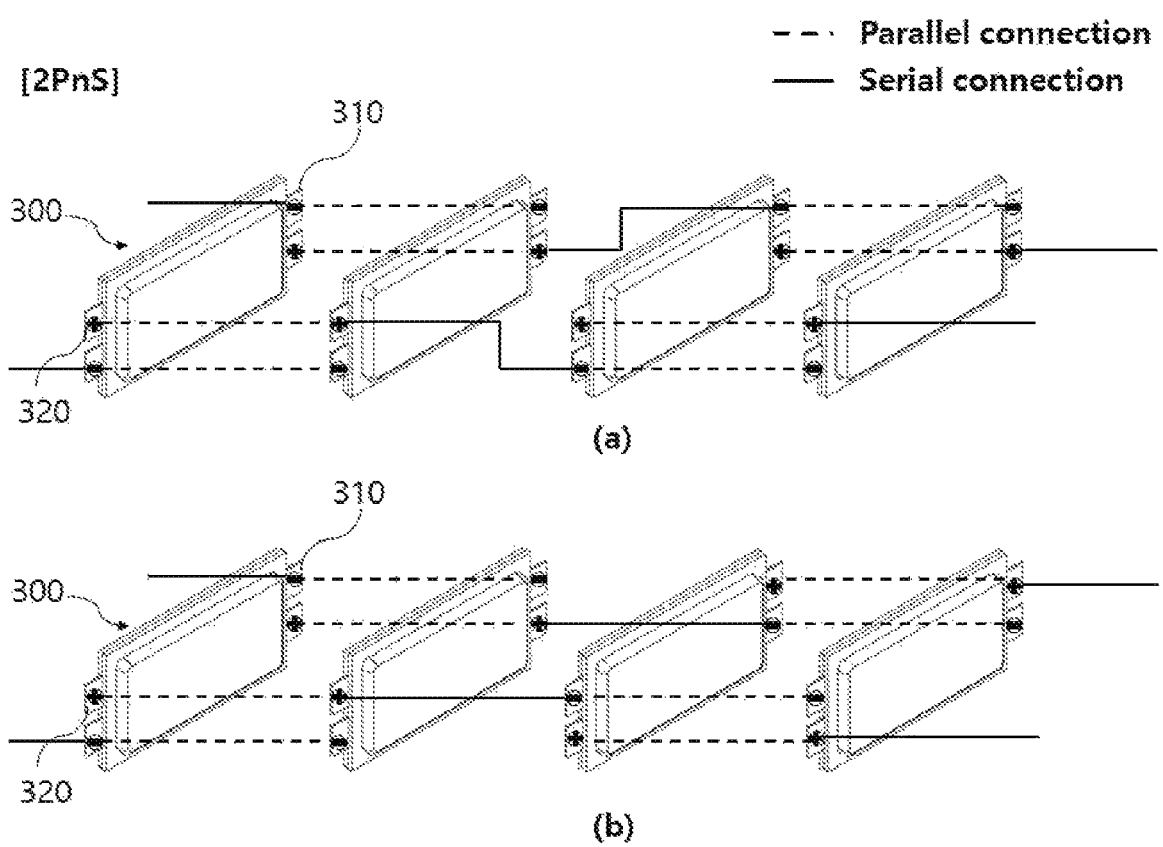

FIGS. 16 and 17 are illustrative view showing a coupling between the battery modules according to a second embodiment of the present invention. FIG. 16 shows series and parallel connections of the battery modules in which the electrode terminals forming the external electrodes formed on both end portions of the battery cells in the stacked direction according to the 2-4-th embodiment have different polarities in the stacked direction (y axis) and the length direction (x axis) of the battery cells. In this case, a plurality of battery cells may be stacked in a Y axis direction to form, a plurality of unit modules 4000a, and the respective unit modules 4000a may be stacked to be adjacent to each other in an X axis or Y axis direction to configure to the battery module.

Section-A

A section-A in FIG. 16 shows that the unit modules 4000a are connected in series with each other in the stacked direction of the battery cells. Here, the cathode terminal 410 and the anode terminal 520 having different polarities are connected to each other, such that the unit module 4000a may be connected in series with the other unit module 4000a stacked to be adjacent to thereto in the Y axis direction.

Section-B

A section-B in FIG. 16 shows that the unit modules 4000a are connected in series with each other in the length direction (X axis) of the battery cells. Here, the cathode terminal 410 and the anode terminal 520 having different polarities are connected to each other, such that the unit module 4000a may be connected in series with the other unit module 4000b stacked to be adjacent to thereto in the X axis direction. In this case, the unit module 4000a is configured such that the battery cells are connected in parallel to each other in the order of 500-100-400 and the unit module 4000b is configured such that the battery cells are connected in parallel to each other in the order of 400-100-500. In order for the electrode terminals forming the external terminals facing each other in the X axis direction to have the cathode terminals 410 and the anode terminals 520 having the different polarities, the unit modules 4000a and 4000b connected in series with each other may be preferably connected to each other using a pair of unit modules 4000a and 4000b in which the direction of the electrode terminals of the external terminals has the inverted shape so that the external terminals form different polarities on both ends in the stacked direction (y axis).

Section-C

A section-C in FIG. 16 shows that the unit modules 4000a are connected in parallel to each other in the stacked direction of the battery cells. Here, the cathode terminal 410 and the anode terminal 520 having the same polarity are connected to each other, such that the unit module 4000a may be connected in parallel to the other unit module 4000a stacked to be adjacent to thereto in the Y axis direction.

As described above, the battery module configured in the combination of the battery cells according to the present invention may be variously modified in accordance with a designed regulation, and has an advantage that the battery module may be freely connected in a length direction and a thickness direction of the battery module.

When it is difficult to directly connect the electrode terminals to each other, the battery cells may be connected to each other in series and in parallel using an external bus bar, if necessary, as shown in FIGS. 18 to 21. According to the present invention, the electrode terminals of the battery cells forming the battery module may be connected to each other, and the connection between the electrode terminals of the battery cells according to the present invention may be variously modified without departing from the scope of the present invention.

In this case, the battery cells according to the present invention has an advantage that since the battery cell includes the plurality of electrode terminals, the battery cells are connected in series with each other through the contact between the electrode terminals adjacent to each other by inverting the battery cells in a height direction for series connection as shown in FIG. 19B, FIG. 20B, and FIG. 21B, such that the electrode terminals adjacent to each other may be connected to each other without using a separate bus bar.

In the battery cell according to the present invention having the configuration described above, since various forms of configurations of the battery module may be applied according to the layout of the vehicle by forming the plurality of electrodes on both sides opposing each other to improve the degree of freedom of the connection of the battery cells, the cells may be connected in series with or in parallel to each other only by the connection of the electrodes. Since the separate bus bar is not included, the resistance value according to the connection of the electrodes may be lowered to develop a high efficiency battery module. Since a consistent work process for connecting the batteries is performed, a process quality of the conventional battery module may be improved.

The present invention is not limited to the above-mentioned embodiments, and may be variously applied, and may be variously modified without departing from the gist of the present invention claimed in the claims.

DETAILED DESCRIPTION OF MAIN ELEMENTS 1000, 2000, 3000, 4000: battery module
100, 200, 300, 400, 500: battery cell
110, 210, 310, 410, 510: cathode terminal
120, 220, 320, 420, 520: anode terminal
130, 230, 330, 430, 530: electrode assembly
140, 240, 340, 440, 540: external case

What is claimed is:

1. A battery cell having electrode terminals including cathode terminals and anode terminals protruding to the outside, the battery cell comprising:
 a plurality of electrode terminals selected from the cathode terminals or the anode terminals and formed on both sides of the battery cell opposing each other,
 wherein the battery cell comprises two or more cathode terminals or anode terminals having the same polarity on one side of the battery cell, and a cathode terminal and an anode terminal on the other side opposing the one side for having different polarities.

2. A battery module formed by stacking two or more battery cells having cathode terminals and anode terminals protruding to the outside,
 wherein the battery cell comprises a plurality of electrode terminals selected from the cathode terminals or the anode terminals on both sides of the battery cell opposing each other, and
 the battery cells are electrically connected to each other by serial or parallel connection between the plurality of electrode terminals of neighboring battery cells,
 wherein the battery cell is a secondary battery having a pouch-type case and an electrode assembly wherein the electrode assembly is a winding type in which one cathode plate and one anode plate are wound together with the separator, or stacked type in which a plurality of cathode plates and a plurality of anode plates are alternately stacked while having the separator interposed therebetween, and
 wherein some of the battery cells comprise the cathode terminals on one side and the anode terminals on the other side for having different polarities,
 rest of battery cells comprise two or more cathode terminals or anode terminals having the same polarity on one side of the battery cell, and a cathode terminal and an anode terminal on the other side opposing the one side for having different polarities.

3. A battery module formed by stacking two or more battery cells having cathode terminals and anode terminals protruding to the outside,
 wherein the battery cell comprises a plurality of electrode terminals selected from the cathode terminals or the anode terminals on both sides of the battery cell opposing each other, and
 the battery cells are electrically connected to each other by the serial or parallel connection between the plurality of electrode terminals of neighboring battery cells,
 wherein the battery cell is a secondary battery having a pouch-type case and an electrode assembly wherein the electrode assembly is a winding type in which one cathode plate and one anode plate are wound together with the separator, or stacked type in which a plurality of cathode plates and a plurality of anode plates are alternately stacked while having the separator interposed therebetween, and
 wherein the battery cells comprising the cathode terminals on one side and the anode terminals on the other side for having different polarities are disposed in parallel connection between battery cells comprising two or more cathode terminals or anode terminals having the same polarity on one side of the battery cell, and a cathode terminal and an anode terminal on the other side opposing the one side for having different polarities.

4. The battery module of claim 3, wherein the battery cell and the pair of battery cells which are connected in parallel to each other are staked in plural and are connected in series with each other.

5. The battery cell of claim 1, wherein the battery cell is a secondary battery having a pouch-type case.

6. The battery cell of claim 5, wherein the battery cell includes an electrode assembly wherein the electrode assembly is a winding type in which one cathode plate and one anode plate are wound together with at least one separator, or a stacked type in which a plurality of cathode plates and a plurality of anode plates are alternately stacked while having at least one separator interposed therebetween.

7. The battery cell of claim 1, wherein the cathode terminals or the anode terminals of the battery cell are bent and connected at a predetermined angle with neighboring cathode or anode terminals of other battery cells.

8. The battery cell of claim 7, wherein the angle at which the electrode terminals are bent is determined by a thickness of the electrode terminals and an arrangement with neighboring battery cells.

\* \* \* \* \*